US007245471B2

(12) United States Patent
Pollock et al.

(10) Patent No.: US 7,245,471 B2
(45) Date of Patent: Jul. 17, 2007

(54) DISCHARGE DEVICE FOR INDUCTIVE DEVICES

(75) Inventors: Michael Pollock, Troy, MI (US); Fred Kahl, Grosse Ile, MI (US)

(73) Assignee: Edw. C. Levy Co., Dearborn, MI (US)

( * ) Notice: Subject to any disclaimer, the term of this patent is extended or adjusted under 35 U.S.C. 154(b) by 263 days.

(21) Appl. No.: 10/696,104

(22) Filed: Oct. 29, 2003

(65) Prior Publication Data

US 2005/0094345 A1 May 5, 2005

(51) Int. Cl.
*H02H 3/20* (2006.01)

(52) U.S. Cl. .................................... 361/91.5; 361/159

(58) Field of Classification Search ................ 361/159, 361/150, 160, 120, 91.5, 91.6, 112
See application file for complete search history.

(56) References Cited

U.S. PATENT DOCUMENTS 2,838,634 A * 6/1958 Kesselring et al. .......... 337/154
3,377,496 A 4/1968 Fruengel et al. ............ 313/175
3,483,430 A * 12/1969 Osteen et al. ............... 315/159
3,487,261 A * 12/1969 Boksjo et al. .............. 315/150
3,711,744 A 1/1973 Luton, Jr. ................. 317/13 D
3,934,175 A 1/1976 Clark .......................... 317/16
4,455,585 A 6/1984 Murari et al. ................. 361/18
4,463,405 A 7/1984 Koch et al. ................. 361/135
4,467,384 A 8/1984 Yuasa .......................... 361/19
4,520,249 A * 5/1985 Czerlinski .................... 219/634
4,544,983 A 10/1985 Anderson et al. ........... 361/119
4,554,610 A 11/1985 Metz et al. ................. 361/144
4,571,656 A 2/1986 Ruckman ..................... 361/56
4,625,255 A 11/1986 Borkowicz et al. ........... 361/91
5,049,786 A * 9/1991 Gotisar et al. ........ 315/209 CD
5,331,269 A 7/1994 Armond et al. ............... 320/39
6,070,568 A * 6/2000 Dibble et al. ............... 123/653
6,088,210 A * 7/2000 Goodman ................... 361/160

FOREIGN PATENT DOCUMENTS

FR 2 685 983 7/1993

* cited by examiner

*Primary Examiner*—Michael Sherry
*Assistant Examiner*—Lucy Thomas
(74) *Attorney, Agent, or Firm*—Honigman Miller Schwartz and Cohn LLP

(57) ABSTRACT

A method and apparatus for protecting an energized inductive device such as an electromagnet from an open circuit, i.e., the loss of the power source for the inductive device. A diode is connected across terminals of the inductive device such that when the inductive device is normally energized, the diode is reversed-biased. A spark gap enclosed in a housing is connected in series with the diode. An inert gas fills the housing. A resistance in the form of one or more resistors is in series with both the diode and the spark gap. Upon the sudden loss of supply to the energized device, the diode, the resistance and the spark gap form a path for the discharge of energy from the inductive device.

20 Claims, 3 Drawing Sheets

DISCHARGE DEVICE FOR INDUCTIVE DEVICES

BACKGROUND OF THE INVENTION

1. Field of the Invention

The invention relates to controls for inductive devices and, more particularly, to a discharge device for a large inductive device such as an electromagnet.

2. Description of the Related Art

Large inductive devices are oftentimes incorporated into industrial applications. For example, an electromagnet is merely an encased inductor. Electromagnets can be used with a crane as lifting magnets in the steel industry for scrap material handling. The electromagnet is coupled to a magnet controller, which includes an electrical circuit that typically receives a DC voltage from a generator or other source and controls the voltage applied to, and thus the current flow through, the electromagnet.

The industrial applications in which these inductive devices are incorporated are such that the device and any controller are subject to harsh conditions in which damage to the equipment can easily result. For example, the conductors providing the power supply to a lifting magnet can be cut or otherwise disconnected from the lifting magnet. If the device is energized when it is abruptly disconnected from its power supply, a voltage level across its terminals can result high enough to damage or destroy the device. The typical rating of insulation for a lifting magnet is 600 volts. If the conductors are cut or otherwise disconnected, the voltage potential across the terminals of the lifting magnet can go as high as 10,000 volts, high enough to breakdown the insulation. The breakdown of the insulation can destroy the electromagnet, which is expensive to repair and/or replace.

In the case of electromagnets, one solution proposed has been the addition of a spark gap surge arrester including two electrodes, each connected to a separate terminal of the electromagnet. When the voltage level is high enough, the air gap between them breaks down. The resultant spark discharges the energy from the electromagnet. However, such arresters are exposed to damage themselves due to the harsh environments in which they are located.

SUMMARY OF THE INVENTION

The present invention discloses an apparatus and method for a controlled discharge of energy from an inductive device such as an electromagnet that protects the device from destructive voltages resulting from the abrupt disconnection of the device from a supply when the electromagnet is energized, which is referred to herein as an open circuit.

An apparatus for protecting an energized inductive device from an open circuit comprises a diode connected across terminals of the inductive device such that when the inductive device is normally energized the diode is reversed-biased, a spark gap connected in series with the diode, and a housing enclosing the spark gap where the housing is filled with an inert gas.

A method of protecting an energized inductive device from an open circuit comprises the steps of connecting a diode across the terminals of the inductive device such that when the inductive device is normally energized the diode is reversed-biased, connecting a spark gap in series with the diode, and enclosing the spark gap in a housing filled with an inert gas.

A resistance in the form of one or more resistors is connected in series with the diode and the spark gap to absorb the energy from the magnet.

Other variations and applications of the present invention will become apparent to those skilled in the art when the following description of the best mode contemplated for practicing the invention is read in conjunction with the accompanying drawings.

BRIEF DESCRIPTION OF THE DRAWING

The description herein makes reference to the accompanying drawings wherein like reference numerals refer to like parts throughout the several views, and wherein.

DETAILED DESCRIPTION

Figure 1:
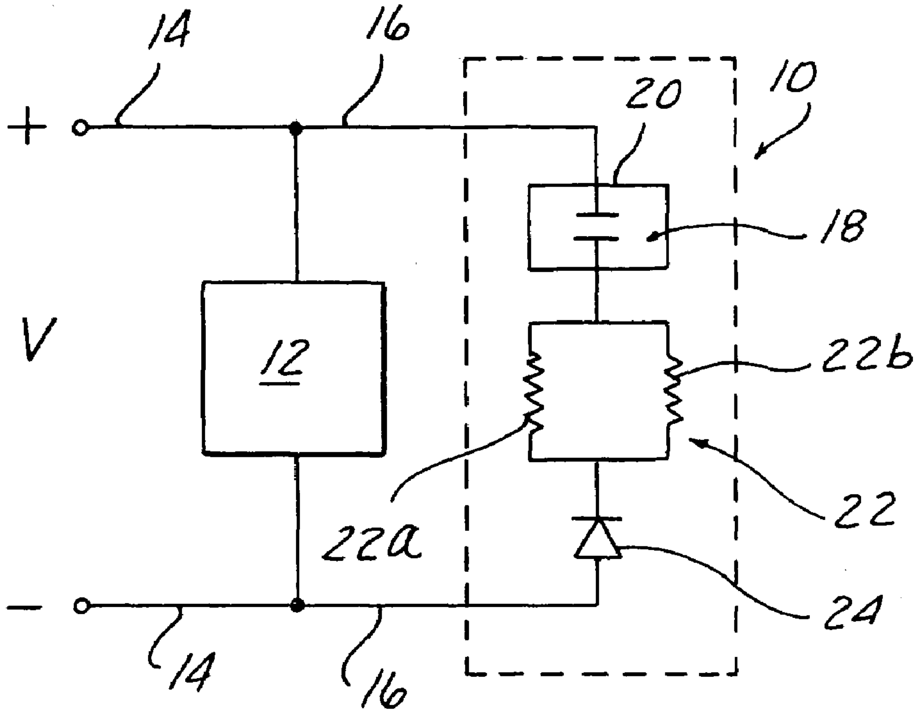
FIG. 1 is a schematic diagram of the discharge device according to the present invention.

An apparatus and method for protecting an inductive device, such as an electromagnet, from excessively high voltages resulting from an open circuit is described with reference to FIGS. 1-6. An open circuit of the inductive device as used herein refers to any circumstance under which the inductive device, when energized by a power source, is abruptly cut off from that source. FIG. 1 is a simplified electrical schematic of one embodiment of the discharge device 10. The inductive device 12 is connected by conductors 14 to a variable or fixed DC supply voltage V with the indicated polarity. The discharge device 10 is connected by conductors 16 such that the discharge device 10 is in parallel with the inductive device 12. Thus, the discharge device 10 is in parallel with both the inductive device 12 and the DC supply voltage V. The discharge device 10 includes a spark gap 18 sealed in a spark chamber 20 filled with an inert gas. The spark gap 18 comprises two spaced electrode plates where one of the spaced electrodes is preferably adjustable. Connected in series with the spark gap 18 is a resistance 22. Here the resistance 22 includes two parallel resistors 22*a*, 22*b*, but the resistance 22 can broadly be any electrical device that absorbs and dissipates energy. A diode 24 is connected so that it normally opposes the flow of current, that is, the diode 24 is reversed-biased with respect to the polarity of the voltage V.

During normal operation, a voltage is supplied to the inductive device 12 to control the flow of current through the inductive windings, energizing the inductive device 12. No current flows through the discharge device 10 because of the existence of the reversed-biased diode 24. When the inductive device 12 is energized, the loss of one or both of the conductors 14 will cause the inductive device 12 to see an open circuit in place of the supply voltage V. The discharge device 10 provides a path to dissipate the charge on the inductive device 12.

Specifically, when the inductive device 12 is energized and sees an open circuit, the diode 24 becomes forward-biased. When the voltage across the spark gap 18 gets high enough, a spark is generated in the spark chamber 20, and an arc provides a path to the flow of current from the inductive device 12 through the resistance 22 and the diode 24, thereby dissipating the energy of the inductive device 12. Because of the fast rate of change of the current di/dt through the inductive device 12 in the event of an open circuit at the source, the resistance 22 is used to slow down the firing of the discharge device 10. The size and ratings of any components of the resistance 22 are selected based upon the expected current flow through, the voltage drop across and the rating of the inductive load of the inductive device 12. Of course, a variable resistance provided by a rheostat is also possible.

Preferably the distance between the terminals comprising the spark gap 18 is adjustable. As is known, the strength of an electrical field formed between the terminals is proportional to the distance and the breakdown voltage of the inert gas.

Based upon the expected peak power to be dissipated and the selection of the inert gas, one of skill in the art can calculate the desirable size of the spark gap 18. In addition, the distance may need to be periodically adjusted due to wear on the surface of the terminals. Additional details of these components and the operation of the discharge device 10 will be discussed in further detail using an electromagnet as an example with reference to FIGS. 2-6.

Figure 2:
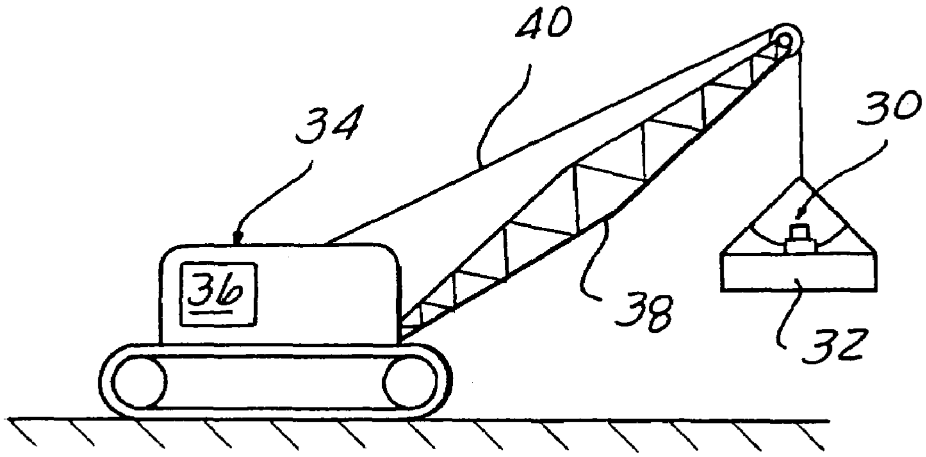
FIG. 2 is a pictorial diagram of a crane supporting a lifting magnet and incorporating a discharge device according to the present invention.

FIG. 2 shows a discharge device 30 according to the present invention in relationship with an electromagnet 32. The discharge device 30 is mounted on a crane 34 supporting a magnet controller 36. The magnet controller 36 is not shown in detail as the invention is operable with any commercially available magnet controller that provides a voltage supply to energize and de-energize the electromagnet 32 in a controlled manner. A derrick 38 extends upward from the crane 34 and supports the electromagnet 32, here a lifting magnet, with a cable 40. The cable 40 comprises conductors for supplying power to the electromagnet 32 from the magnet controller 36 using the proper polarities. The discharge device 30 can be bolted or spot welded to the electromagnet 32 and is connected across the conductors of the cable 40 as previously discussed. One of skill in the art will recognize that other configurations for supporting the electromagnet 32 are contemplated. Hereinafter, the electromagnet will be referred to as the magnet 32 for simplicity.

Figure 3:
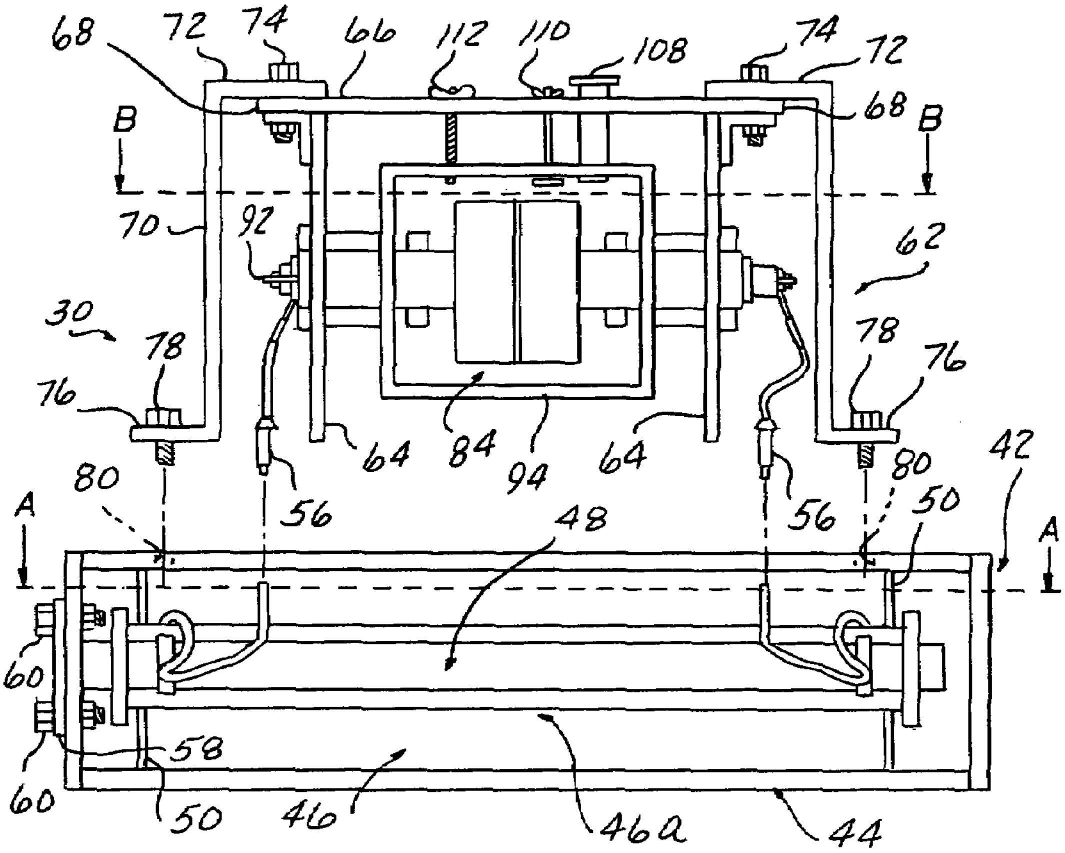
FIG. 3 is a simplified, exploded elevation view of a discharge device according one embodiment of the present invention.
Figure 4:
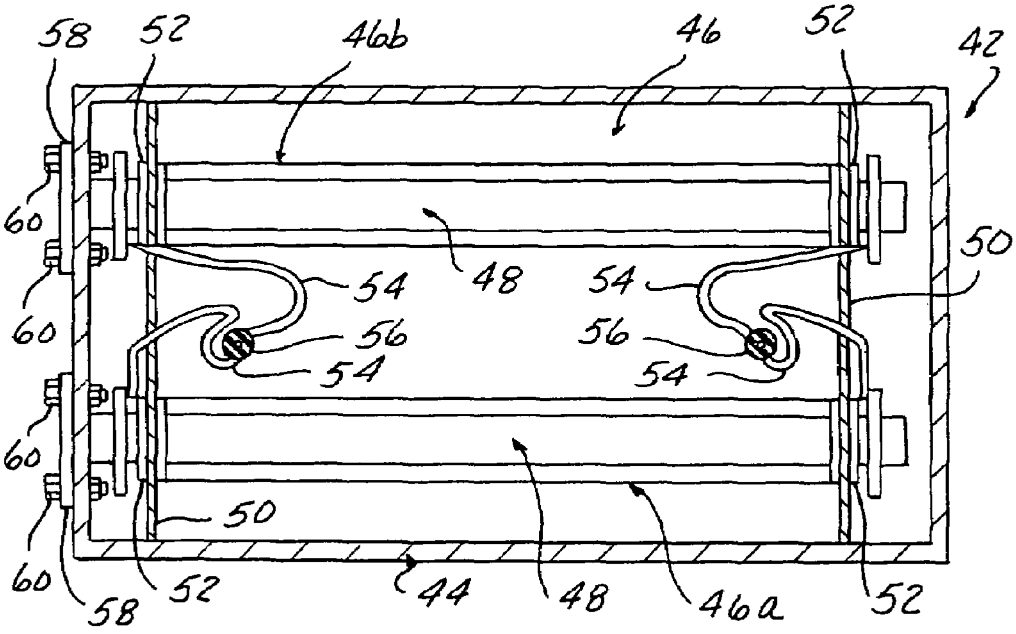
FIG. 4 is a cross-sectional view of the discharge device according to FIG. 3 along the line A-A shown therein.

FIG. 3 is an exploded view of two assemblies that comprise one embodiment of the discharge device 30 for use with the magnet 32. The first assembly 42 is also shown in the cross-sectional view of FIG. 4, so the features of each will be discussed. The first assembly 42 includes a rectangular box housing 44 made of a durable material, such as steel. Mounted inside the first assembly 42 is a resistance 46 that corresponds to the resistance 22 of FIG. 1. The resistance 46 comprises two resistors **46*a*,46*b* (only resistor 46*a* is shown in FIG. 3). Each of the resistors 46*a*,46*b* are power resistors rated at 20 ohms, 220 watts. Wire wound vitreous enamel power resistors wound on dowel rods 48 are suitable for this application. In this exemplary embodiment, the dowel rods 48** are 11 inches long with a ¾" diameter.

The resistors **46*a*,46*b* are supported by parallel lengths of keystock 50 extending perpendicular to the length of the resistors 46*a*,46*b* and abutting the inside walls of the first assembly housing 44. Each length of keystock 50 includes respective groove cuts spacing the resistors 46*a*,46*b* apart from one another by, for example, one-half inch. At least one isolation dampner 52 (not shown in FIG. 3) supports each end of each resistor 46*a*,46*b* in the respective groove cuts of the keystock 50. The isolation dampners 52 can be any material, such as an elastomeric material, able to protect the resistors 46*a*,46*b* from vibration. Electrical connectors 54 couple the resistors 46*a*,46*b* together in parallel and are connected to the remaining elements of the discharge device 30 and the magnet 32 through the rubber grommets 56 extending through the first assembly housing 44 from the second assembly 62 of the discharge device 30, discussed hereinafter. Although they are not shown in detail, end plates 58 can be fixed to respective resistors 46*a*,46*b* and releasably secured to the first assembly housing 44 with bolts 60 such that the resistors 46*a*,46*b*** can be easily inspected and/or replaced.

Figure 5:
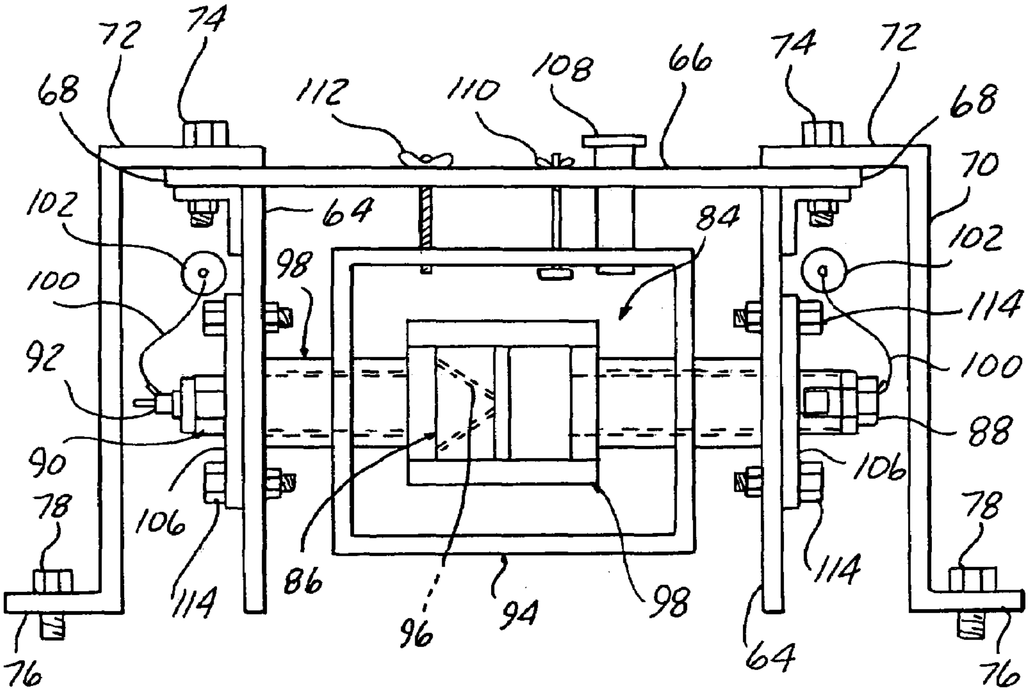
FIG. 5 is a detailed elevation view of the first assembly of FIG. 3.
Figure 6:
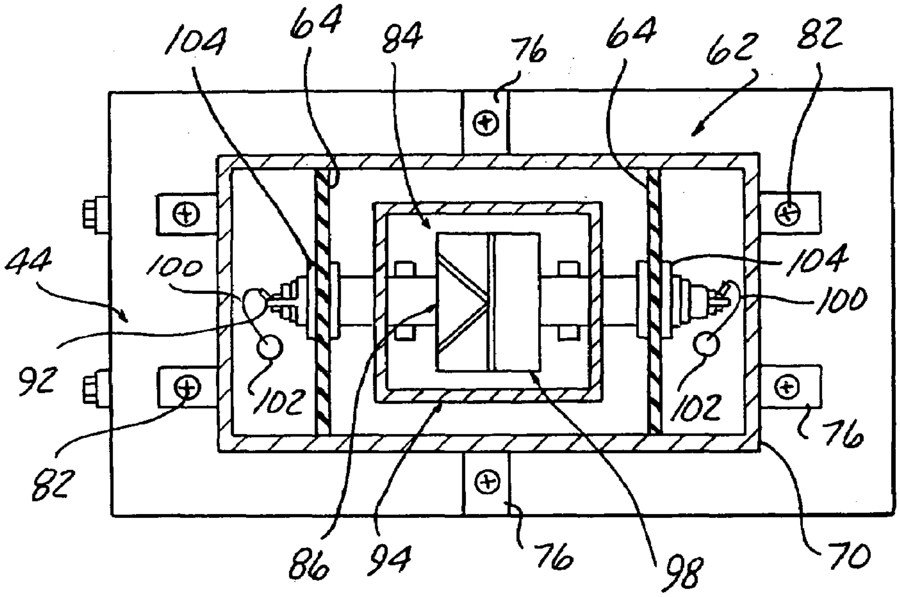
FIG. 6 is a cross-sectional view of the discharge device according to FIG. 3 along the line B-B shown therein.

The second assembly 62 is shown in varying detail in each of FIGS. 3, 5 and 6, which are described concurrently. The second assembly 62 includes two parallel non-metallic supports 64 that, when the two assemblies 42, 62 are joined, abut the top surface of the first assembly housing 44. The two parallel supports 64 are joined across the top by a crosspiece, or lid, 66, either integral or fixed thereto by a bracket, wherein the lid 66 has outwardly extending flanges 68. A relatively thick metal box frame 70, preferably ¾" steel, has a flange 72 extending inwardly that is secured to the corresponding flanges 68 of the lid 66 with through-bolts 74. One or more outwardly extending flanges 76 extend from the box frame 70 and are used to secure the second assembly 62 to the first assembly 42. Specifically, either bolts 78 extend through the outwardly extending flanges 76 and holes 80 in the first assembly housing 44 as shown in FIGS. 3 and 5 or fastening screws 82 are screwed through the flanges 76 and the first assembly housing 44 as shown in FIG. 6. Of course, other fastening means are possible.

Together, the supports 64, the lid 66 and the box frame 70 support and protect the remaining elements of the discharge device 30, namely the spark gap with its spark chamber and the diode. In this embodiment, the spark gap 18 of FIG. 1 is formed by a firing head 84 shown generally in FIG. 3 and in more detail in FIGS. 5 and 6. In this example, the firing head 84 is one inch thick and two inches wide and is constructed of high nickel or titanium. The firing head 84 includes an adjustable head portion 86 and a fixed ground side 88 as best shown in FIG. 5. The adjustable head portion 86 is coupled to one of the supports 64 with a lock collar 90 (shown only in FIG. 5). The diode 92 is mounted adjacent the lock collar 90. Although only one diode 92 is shown, more than one diode can be used. For example, two diodes can be placed in parallel. The rating of the diode(s) can be determined by one of skill in the art with knowledge of the values of the other components in the circuit comprising the variable voltage source, the inductance of the magnet 32 and the resistance 46. The adjustable head portion 86 extends through an opening in the spark chamber 94 into a point with vent holes 96. The adjustable head portion 86 can be adjusted for the desired voltage limit, for the type of inert gas and for the expected power dissipated by adjustment of the lock collar 90.

The fixed side 88 of the firing head 84 extends through an opening in the spark chamber 94 and is supported by the other support 64. The entire firing head 84 is surrounded by layers 98 of an insulating material as shown in FIG. 5. The diode 92 and the spark gap formed by the firing head 84 have conductors 100 fed through rubber grommets 102, in the wall of the box frame 70 as shown in FIG. 5 or otherwise as shown in FIG. 6, to connect to the magnet 32 as discussed with respect to FIG. 1. Preferably, insulators 104 as shown in FIG. 6 insulate the firing head 84 from the supports 64. The insulators 104 can be incorporated within and supported by plates 106 (shown only in FIG. 5) fixed by bolts 112 to each of the supports 64. When the plates 106 are used, the lock collar 90 fixes the adjustable head portion 86 of the firing head 84 on the side of the plate 106 opposite the support 64.

The spark chamber 94 is filled with an inert gas such as nitrogen at low pressures (5-15 lbs. pressure). An air pressure gauge 108 extends through the lid 66 and into the spark chamber 94 to measure the pressure of the gas. Each of a charge valve 110 and a purge valve 112 similarly extend into the spark chamber 94. The charge valve 110 allows the insertion of the gas, while the purge valve 112 allows gas to leave. Each of the air pressure gauge 108, the charge valve 110 and the purge valve 112 are shown in FIGS. 3 and 5. The Applicants have found that when using a sealed box without the addition of gas, moisture and corrosion result. The inclusion of gas maintained at a pressure equal to or greater than atmospheric pressure reduces moisture and corrosion. When firing head 84 fires, an arc through the gas is established. The gas increases in pressure due to the heat of the arc and may, but not necessarily will, escape from the spark chamber 94 through the purge valve 112. The illustrated discharge device 30 is durable and small, with overall projected dimensions of 11-½" wide by 10-½" long by 6-½" tall.

The actual configuration of the discharge device 30 described herein is by example only. For example, the shape of the firing head 84 can be different than that shown. As another example, instead of being separate boxes, the components of the first assembly 42 and the second assembly 62 could be joined in one box with an appropriate partition between them. Other mechanical details of the device 30 shown, such as insulation and vibration dampning components, can be added or removed based upon the application for the invention. While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A system for protecting an electro-magnet from an over voltage condition, comprising:

an electro-magnetic inductive device, a spark gap discharge device, a diode, a resistor, wherein the spark gap discharge device, the diode, and the resistor are all connected in series to form a protective discharge means for protectively discharging electrical energy, wherein the protective discharge means is connected in parallel across said electro-magnetic inductive device for preventing the electro-magnetic inductive device from developing destructively high voltage levels that occur during an abrupt change in current flow through the electro-magnetic inductive device.

2. The system for protecting an electro-magnet from an over voltage condition of claim 1, further including:

a housing enclosing the spark gap discharge device, wherein the housing contains an inert gas.

3. The system for protecting an electro-magnet from an over voltage condition of claim 1, wherein the resistor is a wire wound vitreous enamel power resistor.

4. The system for protecting an electro-magnet from an over voltage condition of claim 1, wherein the resistor is mounted using an elastomeric material.

5. The system for protecting an electro-magnet from an over voltage condition of claim 1, wherein the spark gap discharge device includes an adjustable head portion and a fixed side.

6. system for protecting an electro-magnet from an over voltage condition of claim 5, wherein at least one of the adjustable head portion and the fixed side are fabricated from metal that includes nickel or titanium.

7. The system for protecting an electro-magnet from an over voltage condition of claim 2, wherein the housing includes a charge valve for adding inert gas into the housing.

8. The system for protecting an electro-magnet from an over voltage condition of claim 2, wherein the housing includes a pressure sensitive purge valve that allows pressurized gas to escape from said housing when the pressure of the pressurized gas exceeds a pressure threshold.

9. The system for protecting an electro-magnet from an over voltage condition of claim 2, wherein the housing includes a pressure gauge for measuring the pressure within the housing.

10. The system for protecting an electro-magnet from an over voltage condition of claim 2, wherein the housing is mechanically mounted directly on the electro-magnetic inductive device.

11. The system for protecting an electro-magnet from an over voltage condition of claim 2, wherein the inert gas is nitrogen.

12. The system for protecting an electro-magnet from an over voltage condition of claim 2, wherein the inert gas exerts a pressure within said housing in the range of 5-15 pounds.

13. A system for protecting a device from a high voltage power supply open circuit comprising:

an inductive device;

a spark gap;

a diode connected in series with the spark gap that define an inductive discharge device, wherein the inductive discharge device is connected across terminals of the inductive device;

a power supply that energizes the inductive device, wherein the inductive device is operable to either be energized by the power supply so that the diode is reversed-biased to prevent current flow through the inductive discharge device, or energized so that the diode is forward-biased to permit energy stored by the inductive discharge device to be discharged by the spark gap when the inductive device sees an open circuit across the power supply.

14. The system according to claim 13 further comprising:

a resistance in series with the diode and the spark gap.

15. The system according to claim 13 wherein the resistance comprises at least two resistors connected in parallel.

16. The system according to claim 13 further comprising:

a housing enclosing the spark gap, the housing filled with an inert gas; and a charge valve operable to allow insertion of the inert gas into the housing.

17. The system, according to claim 16 further comprising:

a purge valve operable to allow at least one of venting and removal of the inert gas from the housing.

18. The system according to claim 16 wherein the inductive device is an electromagnet.

19. The system according to claim 16 further including:

a purge valve extending into the housing, the purge valve operable to allow at least one of venting and removal of the inert gas from the housing.

20. The system according to claim 16 further including:

an air pressure gauge extending into the housing, the air pressure gauge operable to measure the pressure of the inert gas.

* * * * *